Aug. 1, 1967 P. F. CATALANO ETAL 3,333,754
CONTINUOUS CONTAINER FORMING APPARATUS
Filed Sept. 13, 1963
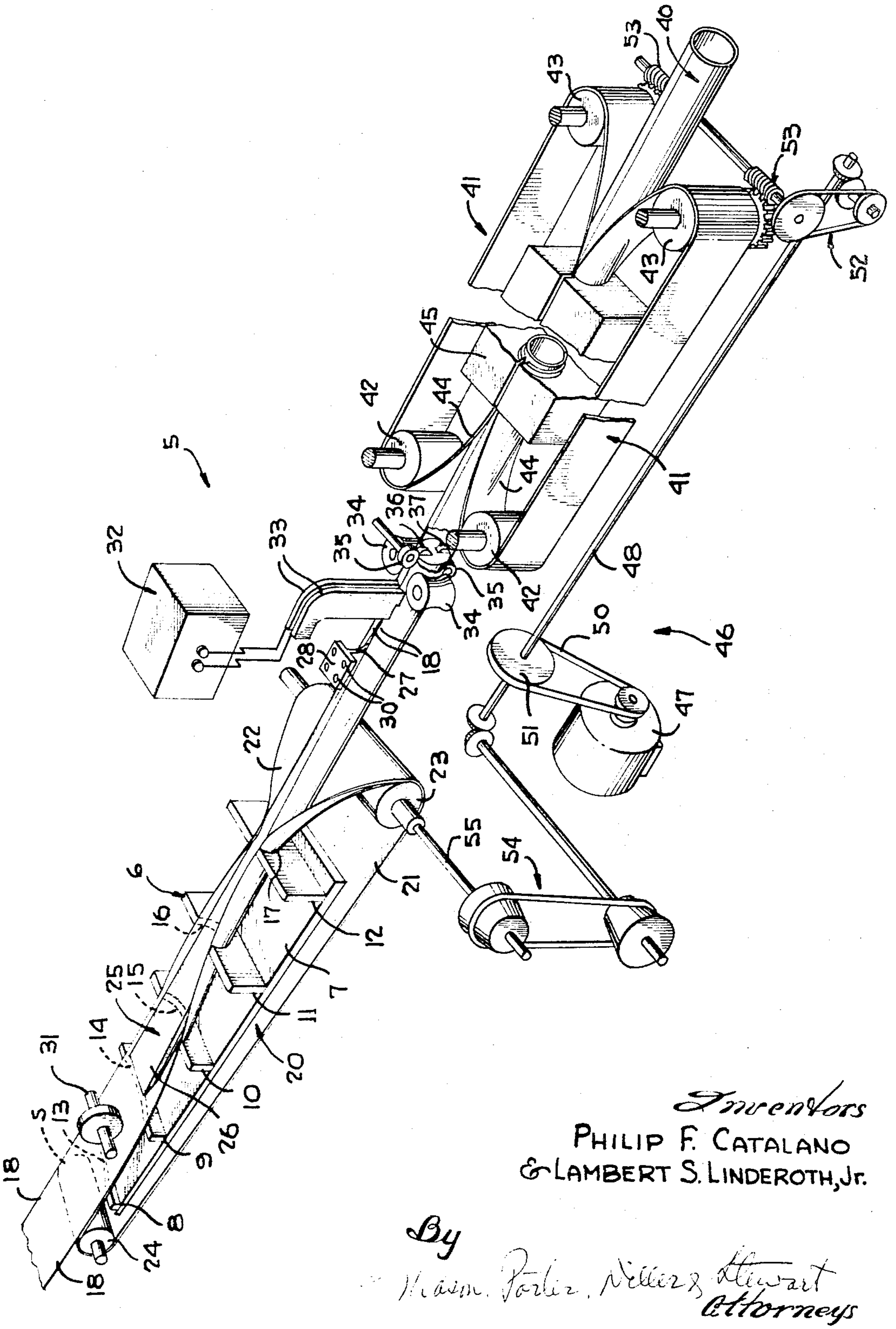
*Inventors*
PHILIP F. CATALANO
& LAMBERT S. LINDEROTH, Jr.
*By* Mason, Porter, Diller & Stewart
*Attorneys*

United States Patent Office 3,333,754
Patented Aug. 1, 1967

1

3,333,754
CONTINUOUS CONTAINER FORMING APPARATUS

Philip F. Catalano, Chicago, Ill., and Lambert S. Linderoth, Jr., Battle Creek, Mich., assignors to Continental Can Company, Inc., New York, N.Y., a corporation of New York Filed Sept. 13, 1963, Ser. No. 308,818
11 Claims. (Cl. 228—15)

This invention relates to a novel apparatus for manufacturing continuous lengths of tubing from continuous strips of thin metallic material by conveying a strip through a plurality of template or forming members which are longitudinally spaced along a predetermined path of travel and simultaneously subjecting the conveyed strip to traction forces applied by a mechanism moving in synchronism with the movement of the strip.

This invention provides a commercially feasible apparatus for guiding edge portions of a continuous, longitudinal, thin metallic strip into tubular shape which is subsequently joined along the edge portions by a conventional joining operation, such as a hot forging or fusion welding operation. Alternatively, such joining may be accomplished through the application of a high-energy source to the edge portions of the strip in several conventional ways, each of which protects any exterior printing or decorative coatings applied to the strip prior to the formation thereof into a continuous tube.

Heretofore, thin wall metal containers such as those which are used for packaging industrial products, food products, pharmaceuticals, cosmetics, etc., have been produced by several successive steps. Initially, thin metallic sheets of the proper gauge having a plane exterior surface or a lithographed or protective coating applied to the exterior surface thereof are slit to a length and a width suitable for manufacturing a single container body. Each of these slit sheets or container blanks are formed into a cylindrical or substantially cylindrical shape. This is generally accomplished by bringing the longitudinal edge portions of the container blanks into opposed relationship in either overlapping relationship or in a "lock-and-lap" seam. While each container blank is in this tubular configuration, the opposing edge portions are generally soldered to retain the general tubular or cylindrical configuration, and thereafter, a flange is formed at each end of the cylindrical container bodies.

Present day container body manufacturing equipment of the type above-described which produces a container from a single container blank has been improved and more fully automated over the years. The speed of this equipment is generally about 400 to 500 containers per minute.

A newer and considerably faster and cheaper method of manufacturing container bodies is represented in continuous tube welding accomplished by joining together the opposing longitudinal edge portions of a continuous, elongated strip having a transverse width of approximately the desired circumference of the container body. This is done in various ways, for example, in a manner as is disclosed in U.S. Patent No. 2,886,691 to W. C. Rudd granted May 12, 1959, by employing high frequency resistance welding; or by employing high frequency induction welding apparatus of the type disclosed in U.S. Patent No. 2,687,464 to Thomas J. Crawford granted August 24, 1954. The continuous metal tube produced by any of the methods disclosed in these patents is sub-divided transversely into discrete can bodies employing conventional apparatus, such as a flying shear.

This type of continuous tube-forming equipment is known in the prior art and characteristically employs a multiplicity of pairs of male and female rollers. Each

2 pair of rollers is confined in heavy housings and these housings are positioned along a predetermined path of travel of the strip to gradually form the metallic strip until the longitudinal edge portions are brought into abutting or overlapping relationship.

If, by the use of such aforementioned equipment, the operation of bringing the oppositely disposed longitudinal edge portions of the strip into abutting relationship is accomplished too rapidly, these edge portions are stretched more than the center portion of the strip. Thus, any resulting longitudinal weld of the tube is irregular and wavy. Furthermore, permanent crimps and paneling of the strip and the resultant continuous tube also often result.

To minimize these defects the equipment presently employed for manufacturing continuous tubing of a substantially heavier gauge than is required for container bodies operates at a relatively slow speed. It is ponderous and requires a multiplicity of expensive forming mills, expensive forming tools for each diameter pipe, and also for identical diameters of pipes of diverse thickness. Further, by its very nature, such heavy equipment does not prevent scuffing or abrading of the exterior metal surfaces or any decorative coating or lithographed decorations which may be applied to the strip prior to the formation of the continuous tube.

An unscuffed pristine, exterior decorative coating on containers is vitally necessary for retail customer acceptance. Because metal containers generally have the thinnest practical tin coating in order to effect maximum economy, and when possible, no tin coating at all, anticipated shelf-life of the containers is dependent upon the integrity of the exterior protective coatings and decorations. Such coatings are not only more appealing to the eye, but achieve better product protection and longer container life to permit an adequate safety factor beyond the distribution and storage life expected of any product packaged therein. Thus, even though it is highly desirable from an economical standpoint to maintain the exterior metal surfaces and any decorative coatings applied thereto of a scuff or scratch-free nature, present continuous tube forming equipment is unsuitable due primarily to the fragile nature of lighter gauge material presently employed in the manufacture of container bodies and frictional damage caused by the strip passing through the conventional rollers heretofore described.

It is therefore an object of this invention to provide novel apparatus for forming a thin gauge metallic strip into a continuous tube which is subsequently severed into discrete container bodies in a manner which overcomes the disadvantages inherent in present day continuous tube-forming equipment.

A further object of this invention is to provide apparatus for conveying a continuous strip of material along a predetermined path, providing means for presenting longitudinal edge portions of this strip material to conventional prior art joining apparatus and simultaneously eliminating distortion of the container body, irregularity of the joined longitudinal edge portions and scuffing or abrading of any decorative coating on the exterior surface of the strip.

Another object of this invention is to provide a novel continuous tube forming apparatus including means for tractioning and conveying a continuous strip of material along a predetermined path, a plurality of forming means being arranged along the predetermined path to form the strip to a tubular configuration, and moveable means positioned between the forming means and the strip for reducing the frictional forces which occur during the forming operation and tend to distort the strip as well as mar any exterior coating applied to the strip.

Still another object of this invention is to provide a novel apparatus of the type above-described, and in addition, to provide means for synchronizing the traction means and the means between the forming means and the strip whereby distortion forces are reduced to a level to preclude destruction of the smooth decorative appearance of the strip.

A further object of this invention is to provide a novel apparatus for manufacturing a continuously formed tube including a pair of driven belts arranged on opposite sides of a predetermined path for tractioning a continuously formed tube during its fabrication from a continuous strip of material, template means for progressively forming the strip to a generally tubular configuration, arranging a driven belt between the template means and the strip, and synchronously driving the conveyor belt between the strip and the template means at a speed identical to the speed at which the opposed pair of conveyor belts are driven.

A further object of this invention is to provide novel apparatus of the type above-described, and in addition, to provide means for accurately guiding and retaining the conveyor belt and the strip with respect to the template or forming means.

With the above, and other objects in view that will hereinafter appear, the nature of the invention will be more clearly understood by reference to the following detailed description, the appended claims and the several views illustrated in the accompanying drawing:

In the drawing:

The single figure is a top perspective view with parts broken away for clarity of a continuous container forming apparatus constructed in accordance with this invention, and illustrates the operative relationship of the various components of this invention.

An apparatus for the continuous manufacture of container bodies from a generally elongated, continuous strip of metallic material is generally designated by the reference numeral 5 in the drawing.

The apparatus 5 comprises forming means or template means 6. The template means 6 includes a supporting base 7 which is suitably supported in a conventional manner. Five template members or forming members 8 through 12 are secured in upstanding relationship to the base 7. Each of the template members 8 through 12 is arranged generally normally to a predetermined path of travel (unnumbered) established by a continuous, metallic strip of material S, being conveyed generally from left-to-right as viewed in the drawing. The template members 8 through 12 are also generally equally spaced from one another along this predetermined path and also along the longitudinal extent of the base 7. The heights of the template members 8 through 12 progressively increase from left-to-right as viewed in the same figure, and each template is provided with a respective contoured cutout or groove 13 through 17. The radius of curvature of the contoured cutouts 13 through 17 decreases from the template member 8 toward the template member 12 to define a progressively increasing curvature of the cutouts 13 through 17 from the leading template member 8 toward the trailing template member 12. This configuration of the contoured cutouts 13 through 17 brings opposed, identical, longitudinal edge portions 18, 18 of the metallic strip S toward abutting relationship with each other at the template member 12 in a manner clearly illustrated in the drawing.

Conveyor means 20 comprising a conveyor belt 21 having an upper run 22 conveys or transports the strip S from left-to-right in the drawing. The conveyor belt 21 is entrained about a drive pulley 23 and an idler pulley 24 suitably journalled in a conventional manner forming no part of this invention and therefore not illustrated. The conveyor belt 21 is preferably constructed from material having a high co-efficient of friction with respect to the strip S so that no slippage occurs between the strip S and the upper run 22 of the conveyor belt 21 as the strip S is conveyed from left-to-right during the forming operation. It is to be particularly noted that the upper conveyor belt run 22 is confined in the contoured cutouts 13 through 17 of the respective template members 8 through 12 and underlies the strip S.

Both the strip S and the upper conveyor belt run 22 are confined or guided through the contoured cutouts 8 through 12 by a horn 25 having a generally half-moon transverse cross-sectional configuration at an end portion 26 and gradually converging to a substantially circular transverse cross-section (not shown) at a medial portion 27 terminating in a bracket 28. The bracket 28 is provided with a plurality of identical mounting apertures 30 through which suitable studs or bolts (not shown) are inserted for securing the horn 25 to a suitable supporting surface. The strip S is thus interposed or sandwiched between the horn 25 and the upper conveyor belt run 22 of the conveyor belt 21.

During the passage of the strip S along the predetermined path between the horn 25 and the upper conveyor belt run 22, an idler roller 31 urges a longitudinal central portion of the strip S downwardly toward the template members 8 and 9 adjacent the idler pulley 24. The idler roller 31 is suitably journalled in a supporting structure in a conventional manner.

The longitudinal edge portions 18, 18 of the strip S are heated to welding temperature by a suitable source of high frequency energy 32 via a pair of electrodes 33. The pair of electrodes 33 are located adjacent a pair of hour-glass forming rolls 34, 34 which urge the longitudinal edge portions 18, 18 into overlapping relationship prior to the welding thereof by a pair of opposed forge rolls 35, 36 cooperating in a conventional manner. The lowermost forge roll 36 is journalled in a cylindrical portion 37 of the horn 25.

After the strip S has been longitudinally seamed to form a continuous tube 40, the tube 40 passes beyond the forging rolls 35, 36 and is tractioned by a pair of identical conveyor belts 41 each arranged on opposite sides of the predetermined path of travel of the tube 40. Each of the conveyor belts 41 is entrained about an idler roller 42 and a driven roller 43. The rollers 42 and 43 are suitably journalled to a supporting structure (not shown) in a conventional manner. Innermost conveyor belt runs 44, 44 of each of the conveyor belts 41 pass through a conventional mechanism 45 which urges these conveyor belt runs 44, 44 into gripping contact with the seamed tube 40.

To insure no relative slippage occurs between the strip S and the conveyor belt 21 as well as the tube 40 and the conveyor belts 41, 41 these belts are driven in synchronism by a drive assembly which is generally designated by the reference numeral 46. The drive assembly 46 includes a conventional motor 47 driving a main shaft 48 through a pulley belt 50 and a pulley 51 secured to the main shaft 48. Rotation of the main shaft 48 is imparted to the rollers 43, 43 by a conventional take-off pulley assembly 52 which in turn drives a pair of conventional worm and wheel assemblies, 53, 53 each of which is journalled to the rollers 43, 43. Rotation of the main shaft 48 is similarly imparted to the drive roller 23 of the conveyor 21 by a conventional pulley take-off assembly 34 coupled through a shaft 55 to the driven roller 23. Thus, as the main shaft 48 rotates, the conveyor belts 21, 41 and 41 travel in an identical direction at an identical speed. As the conveyor belts 21 and 41 move in longitudinal synchronism, all longitudinal distorting frictional forces exerted on the upper run 22 of the conveyor belt 21 by the template members 8–12 are positively overcome, and surface scuffing or abrading of the exterior surface of the strip S is prevented. This is due to the fact that substantially no relative motion takes place between the engaged portions of the upper conveyor belt run 22 of the conveyor belt 21 and the strip S as it is transported along the predetermined path of travel during the formation of the continuous tube 40.

After the tube 40 has been transported beyond the conveyor belts 41, 41, a conventional shearing mechanism, such as a flying shear (not shown) may be used to sever the continuous tube 40 into individual can bodies.

From the foregoing, it will be seen that novel and advantageous provision has been made for carrying out the desired end. However, attention is again directed to the fact that variations may be made in the example apparatus disclosed herein without departing from the spirit and scope of this invention, as defined in the appended claims.

We claim:

1. Apparatus particularly adapted for use during the welding together of opposite longitudinal edge portions of a substantially continuous strip of material to form a continuous tube adapted to be transversely severed to form individual can bodies comprising means for conveying said strip along a predetermined path, means for tractioning said strip during its movement along said predetermined path, said first means including forming means and a conveyor belt run interposed between said forming means and said strip, and means for synchronizing said first and second mentioned means to preclude strip damage during the movement thereof along the predetermined path.

2. The apparatus as defined in claim 1 wherein said first mentioned means further includes a plurality of contoured template members and means for confining the conveyor belt run and the strip to the general configuration of the template members.

3. The apparatus as defined in claim 1 wherein said second mentioned means includes a plurality of opposed conveyor belts in gripping relationship with said continuously formed tube.

4. The apparatus as defined in claim 1 wherein said first mentioned means further includes a plurality of contoured template members and means for confining the conveyor belt run and the strip to the general configuration of the template members, and said second mentioned means includes a plurality of conveyor belts disposed adjacent said predetermined path for gripping therebetween the continuously formed tube.

5. Apparatus particularly adapted for use during the joining together of opposite longitudinal edge portions of a substantially continuous strip of material to form a continuous tube comprising a first conveyor belt and a pair of opposed conveyor belts, said conveyor belts establishing a generally linear predetermined path of travel for said strip, forming means arranged along said predetermined path of travel, said forming means including a plurality of contoured template members, means confining a run of said first conveyor belt between said template members and said strip, means for urging said pair of opposed conveyor belts in gripping relationship with said continuous tube and means for synchronizing the movement of said belts to preclude strip damage during the movement thereof along the predetermined path.

6. The apparatus as defined in claim 5 wherein said confining means is a horn contoured to the general configuration of the plurality of contoured template members and spaced from said first conveyor belt run a distance substantially equal to the thickness of said strip.

7. Apparatus particularly adapted for use during the joining together of opposite longitudinal edge portions of a substantially continuous strip of material to form a continuous tube comprising a first conveyor belt, a pair of opposed conveyor belts spaced longitudinally from said first conveyor belt along a predetermined path of travel of said strip, said pair of opposed conveyor belts being arranged laterally adjacent said predetermined path, forming means arranged along said predetermined path, said forming means including a plurality of contoured template members, a horn substantially overlaying said template members and contoured to the general configuration thereof, a conveyor belt run of said first conveyor being confiningly interposed between said template member and said horn, means for urging said pair of opposed conveyor belts into gripping relationship with said continuous tube and means for synchronizing the movement of said belts to preclude damage to the strip during its movement along the predetermined path.

8. The apparatus as defined in claim 7 wherein said means for synchronizing the movement of said belts includes a main shaft, each of said conveyor belts being entrained about a drive pulley, and a power-takeoff unit journalling said main shaft to each of said drive pulleys.

9. The apparatus as defined in claim 2 wherein said confining means is a horn contoured to the general configuration of the plurality of contoured template members and spaced from said conveyor belt run a distance substantially equal to the thickness of said strip.

10. The apparatus as defined in claim 9 wherein said conveying and traction means are a plurality of conveyor belts, and the conveyor belts of said tractioning means include at least a pair of conveyor belts disposed in opposed gripping relationship to the continuously formed tube.

11. A method of forming a continuous tube from a substantially continuous strip of sheet material having opposed longitudinal edge portions comprising the steps of conveying the strip of material along a first portion of a predetermined path at a first speed by means of a conveyor belt run disposed between complementary contoured and relatively spaced template and horn means, forming the strip to a generally tubular configuration during the movement thereof between the template and horn means, effecting the conveying of the strip by maintaining the conveyor belt run disposed between the strip and the template means whereby the strip is protectively covered during the formation thereof into a generally tubular configuration, restraining transverse movement of the strip during the movement thereof along the first portion of the path, joining the longitudinal edge portions of the now tubular strip to form a continuous tube, conveying the continuous tube along a second portion of the predetermined path at a second speed, and precluding damage of the strip as it is being conveyed by synchronizing the first and second speeds to convey the strip and the continuous tube at identical speeds irrespective of frictional or drag forces affecting the strip during the formation thereof between the template and horn means.

References Cited

UNITED STATES PATENTS

| | | | |
|---|---|---|---|
| 137,992 | 4/1873 | Wilmot | 72—176 |
| 1,920,900 | 8/1933 | Sykes | 219—59 |
| 1,980,308 | 11/1934 | Adams | 72—176 |
| 2,845,989 | 8/1958 | Ewaldson et al. | 228—15 |
| 3,145,758 | 8/1964 | Spring et al. | 72—179 |

CHARLES W. LANHAM, *Primary Examiner.*

RICHARD J. HERBST, *Examiner.*